United States Patent
Wu et al.

(10) Patent No.: US 6,707,790 B1
(45) Date of Patent: Mar. 16, 2004

(54) ENFORCEABLE AND EFFICIENT SERVICE PROVISIONING

(75) Inventors: Tao Wu, Woburn, MA (US); Edward Knightly, Houston, TX (US); Sudhir Dixit, Weston, MA (US)

(73) Assignee: Nokia Internet Communications, Inc., Mountain View, CA (US)

( * ) Notice: Subject to any disclaimer, the term of this patent is extended or adjusted under 35 U.S.C. 154(b) by 782 days.

(21) Appl. No.: 09/608,633

(22) Filed: Jun. 30, 2000

(51) Int. Cl.$^7$ .......................... G01R 31/08; H04L 12/28
(52) U.S. Cl. ..................... 370/230; 370/395.2
(58) Field of Search .................. 370/229, 230–241, 370/395.1, 395.2, 395.21, 395.4

(56) References Cited

U.S. PATENT DOCUMENTS 6,061,556 A * 5/2000 Rahman ................... 455/406
6,359,877 B1 * 3/2002 Rathonyi et al. ........... 370/349

FOREIGN PATENT DOCUMENTS

WO            983 7708          8/1998

OTHER PUBLICATIONS

Gelenbe, Erol; Bandwidth Allocation and CAC in H–S Networks; 1997; IEEE; pp. 122–129.*
Guaranteeing Statistical QoS to Regulated Traffic: The Single Node Case; Martin Reisslein, Keith W. Ross and Srini Rajagopal; 1999; pp. 1061–1072.
Buffering vs. smoothing for end–to–end QoS: Fundamental issues and comparison; Tao Wu and Edward W. Knightly; Aug. 1999; 10 pages.
A New Approach for Allocating Buffers and Bandwidth to Heterogeneous, Regulated Traffic in an ATM Node; Anwar Elwalid, Debasis Mitra and Robert H. Wentworth; Aug. 1995; pp. 1115–1127.
Enforceable Quality of Service Guarantees for Bursty Traffic Streams; Edward W. Knightly; 1998; pp. 1–8.
T. Wu, et al, "Enforceable and Efficient Service Provisioning", *Computer Communications 23 (2000) 1377–1388*.
A. Skliros, "A Connection Admission Control Algorithm for ATM Traffic Distorted by Cell Delay Variation", *Fundamental Role of Teletraffice in Evolution of Telecommunications Networks, Proceedings of the 14$^{th}$ International Teletraffic Congress*, ITC 14, Tele traffic Science and Engineering Amsterdam, Elsevier, NL, vol. 1B, Jun., 1994, pp. 1385–1394.

* cited by examiner

*Primary Examiner*—David Vincent
(74) *Attorney, Agent, or Firm*—Antonelli, Terry, Stout & Kraus, LLP

(57) ABSTRACT

A network element is deployed in a network of interconnected elements. The network element includes a shared buffer multiplexer connected to a link, a set of regulators connected to the shared buffer mulitplexer, and an admission control unit communicatively coupled to the set of regulators and the shared buffer multiplexer. Each of the set of regulators has an input traffic flow. Each traffic flow has a varying flow rate. In order to control admission of the traffic flow to the link in the network element, the admission control unit evaluates the traffic flowing into each regulator. For each traffic flow, the admission control unit receives an envelope of the flow input to the regulator. The admission control unit maximizes the entropy of a distribution of the rate of flow over all time scales. The admission control unit determines the maximum-entropy distribution for the flow using information derived from the traffic envelope, including bounds of the mean rate, the minimum rate, and the maximum rate. The admission control unit approximates the rate variance of the maximum-entropy distribution for a given maximum rate. The admission control unit makes an admission control decision based on the approximated rate variance for the given maximum rate. If the flow is admitted, the flow is set up and transmission begins.

14 Claims, 3 Drawing Sheets

ENFORCEABLE AND EFFICIENT SERVICE PROVISIONING

BACKGROUND OF THE INVENTION

1. Field of the Invention

This invention relates to allocation of network resources and Quality of Service (QoS) management for regulated traffic flows.

2. Description of the Related Art

A key challenge for future packet networks is to efficiently multiplex bursty traffic flows while simultaneously supporting Quality of Service (QoS) objectives in terms of throughput, loss probability, and end-to-end delay. At one extreme, performance can be assured even in the worst case via deterministic service. In addition to its absolute guarantee, deterministic service also has the advantage of enforceability: when the network guarantees QoS based on the client's worst-case descriptions of their traffic, the network can easily verify that these traffic specifications are satisfied. On the other hand, the most important drawback of a deterministic service is that, by its very nature, it must reserve resources according to a worst-case scenario, and hence has fundamental limits in its achievable utilization.

To overcome the utilization limits of deterministic service, statistical multiplexing is introduced to exploit the fact that the worst-case scenario will occur quite rarely. To account for such statistical resource sharing, the traffic flows' rate fluctuations and temporal correlation must be characterized. In the literature, such properties are often represented via stochastic traffic models, including Markov Modulated, Self-Similar, and others. However, in a shared public network with misbehaving or malfunctioning users, provisioning resources according to such stochastic source characterizations incurs a significant risk, as the underlying assumptions of the model are inherently difficult for the network to enforce or police.

Various disadvantageous attempts to address the fundamental conflicting requirement for deterministic traffic models to isolate and police users, and statistical multiplexing to efficiently utilize network resources, have considered network services only for single time scale flows. When traffic flows have rate variations over even two time scales, significant inaccuracies are encountered when applying a single time scale solution. Consequently, for traffic flows more complex than periodic on-off, new techniques are needed for enforcing network services.

Providing statistical services for deterministically policed traffic flows encounters the problem of statistical characterization based on deterministic policing parameters. Specifically, one usually needs to compute the marginal distributions of the flows' rate in different time scales in order to perform the call admission control.

There are competing considerations in a network. The network needs to carry as much traffic as possible, and it must support the QoS requirements of each individual flow. In other words, while as much traffic as possible is multiplexed together, the traffic is policed or regulated such that the traffic flows do not interfere with each other. As such, there continues to be a need for a solution to the aforementioned problems.

SUMMARY OF THE INVENTION

The invention provides a solution to the problem of allocating network resources and maintaining a level of Quality of Service (QoS) such that traffic flows in the network do not interfere with each other, and the network can provide an efficient statistical multiplexing operation. According to the principles of the invention, an admission control operation characterizes the statistical behavior of every flow using a maximum entropy function. If the traffic envelope, or the upper bound of the traffic rates of all time scales, are known, but nothing else about the traffic is known, the distribution of the traffic flow can be approximated by maximizing the entropy. An upper bound of the mean rate, which can be derived from the traffic envelope, and a lower bound of the traffic rates, which is zero, are always known. The entropy of the distribution is maximized subject to the considerations of mean rate, minimum rate, and maximum rate.

In accordance with an illustrative embodiment of the invention, a network element is deployed in a network of interconnected elements, such as the Internet. The network element includes a shared buffer multiplexer connected to a link, a set of regulators connected to the shared buffer mulitplexer, and an admission control unit communicatively coupled to the set of regulators and the shared buffer multiplexer. Each of the set of regulators has an input traffic flow policed by the regulator. Each traffic flow to a regulator has a varying rate of flow at different time scales.

In order to control admission of the traffic flow through the regulator to the link in the network element, the admission control unit evaluates each traffic flow. For each traffic flow, the admission control unit performs a series of process steps. Each traffic flow signals its traffic envelope to its regulator and to the admission control unit. The traffic envelope varies over different time scales. The admission control unit determines the maximum-entropy distribution for the flow at different time scales by maximizing the entropy of the distribution of the rate of the flow at each time scale. The admission control unit then approximates the rate variance of the maximum-entropy distribution for a given maximum rate. The admission control unit decides whether the flow should be admitted into the network using the approximated rate variance.

Other aspects and advantages of the invention will become apparent from the following detailed description and accompanying drawings, illustrating by way of example the features of the invention.

DETAILED DESCRIPTION

Figure 1:
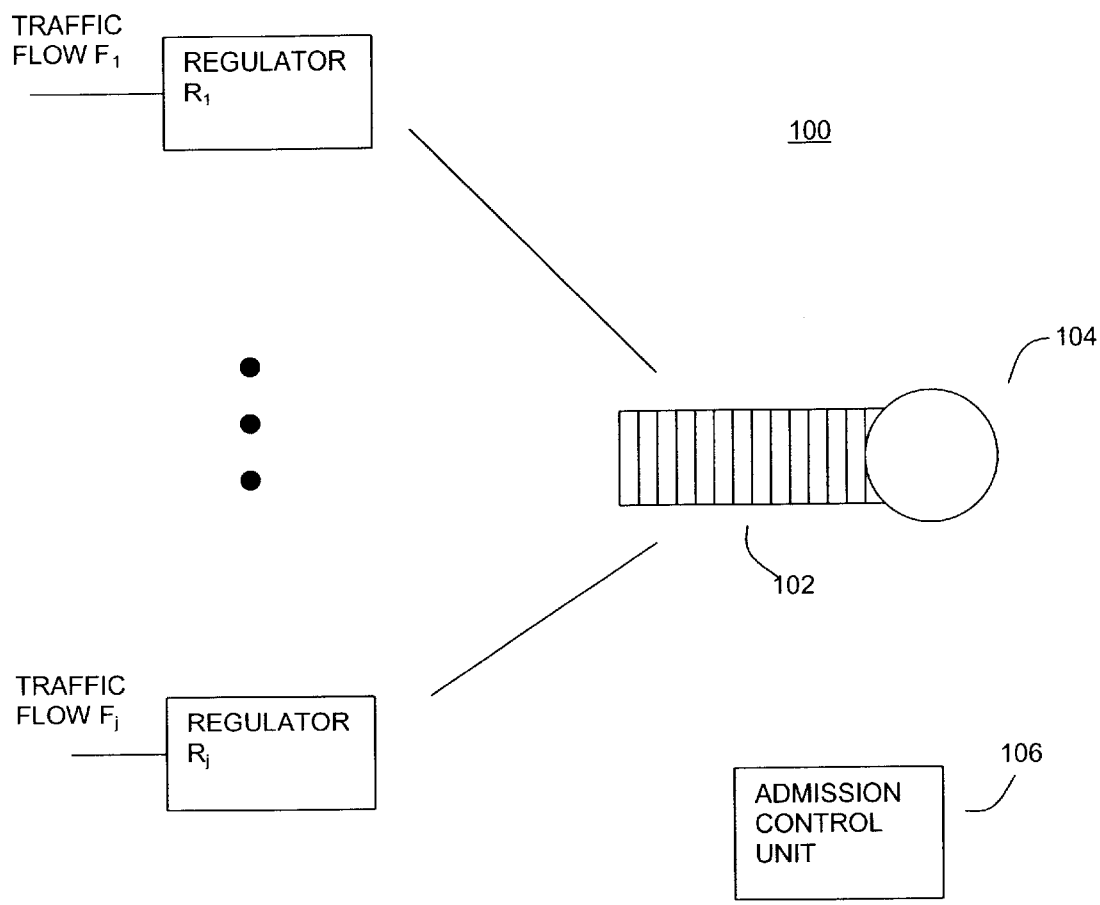
FIG. 1 is a block diagram illustrating a network element in accordance with the principles of the invention.

Network elements, such as routers or switches, on the Internet or other networks encounter conflicting requirements for both deterministic traffic models (i.e., worst case traffic parameters) in order to effectively isolate and police users, and statistical resource allocation to efficiently share and utilize network resources, such as bandwidth and buffer capacity. In accordance with the principles of the invention, a maximum-entropy method is utilized to characterize each traffic flow in a network element. Since user behavior is unknown except for a set of policing parameters, nothing is assumed about the rate's distribution besides those parameters. Consequently, the uncertainty of the rate distribution, i.e., the distribution's entropy, is maximized in accordance with the principles of the invention. As shown in the drawings for purposes of illustration, the rate distribution of the traffic flow is approximated by maximizing the entropy of the source. A Gaussian approximation is used to characterize the aggregate traffic and calculate the loss probability using admission control techniques. An admission control decision is made by determining if loss probability requirements can be met by admitting a new flow while ensuring that all calls in progress and the new one to be admitted will be guaranteed the requested Quality of Service (QoS). The invention can be applied in the call admission control within such network elements as well as in network planning and dimensioning.

The preferred embodiment is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the invention.

FIG. 1 is a generalized block diagram illustrating a network element 100. The network element includes a shared buffer multiplexer 102 connected to a link 104. The link has a bandwidth associated therewith. The network element includes a set of j regulators, $R_1$ to $R_j$, where j is an integer. A respective flow, $F_1$ to $F_j$, is received by each of the set of regulators, $R_1$ to $R_j$. The regulators police the flows and make sure that the flows conform to their own specified parameters. The network element includes an admission control unit 106. The admission control unit 106 is communicatively coupled to the set of regulators $R_1$ to $R_j$ and the shared buffer multiplexer 102.

Signaling and connection management software resides in the admission control unit 106. The admission control unit 106 functions as the on-board processor, provides real-time control, and monitors the status of the network element. Requests for set-up are accepted and calls are admitted based on the bandwidth available in the link 104, the available buffer, and the delay and loss probability requirements of the flow.

Figure 3:
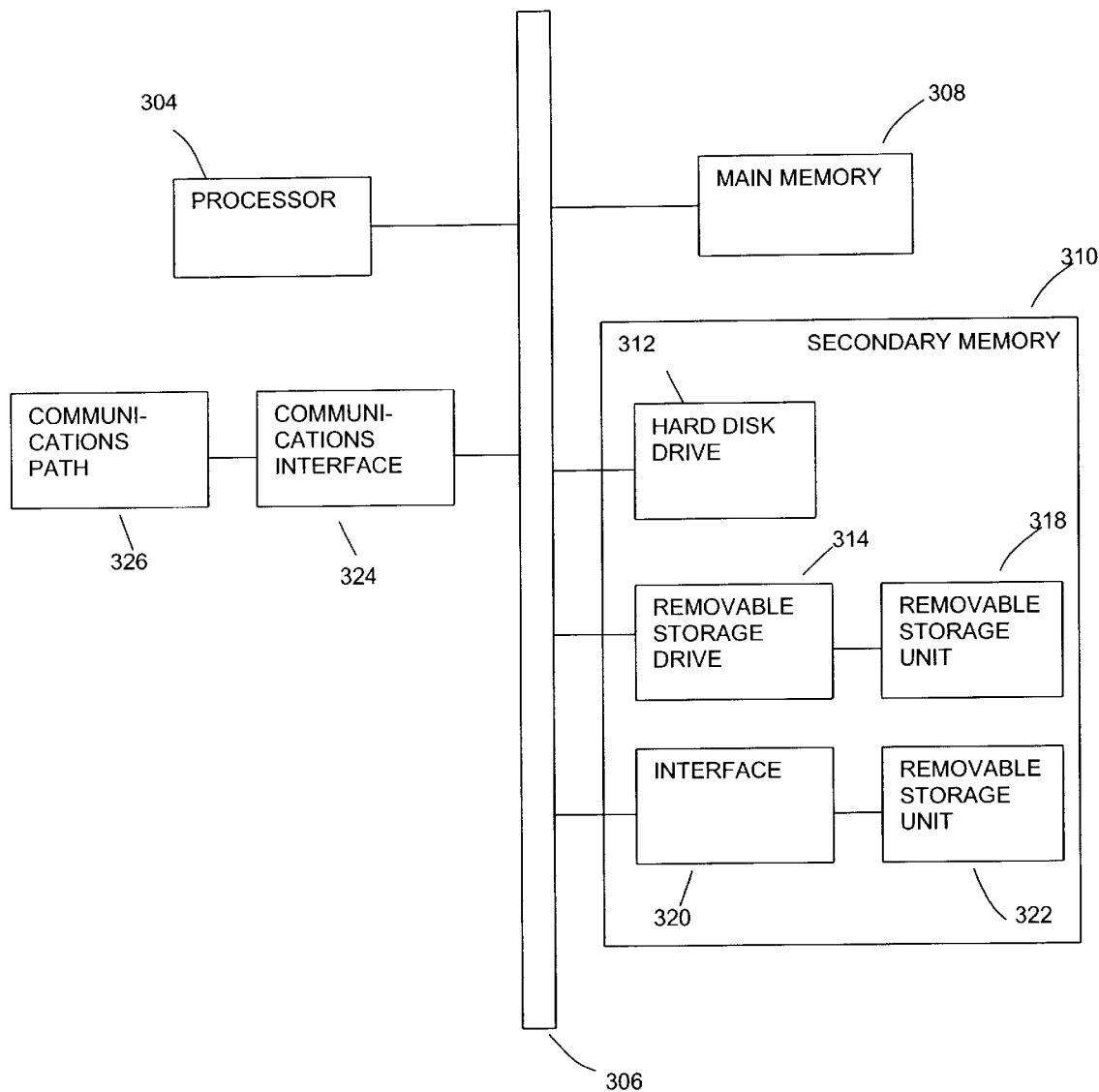
FIG. 3 is a block diagram of an example computer system for implementing the invention.

The admission control unit includes a processor, which is subsequently described with respect to FIG. 3. The processor causes the admission control unit to regulate traffic flow through the set of regulators into the link.

Each traffic flow has a statistical envelope. The statistical envelopes of the traffic flows are approximated using their policing parameters. The only information available is the deterministic envelope (and the mean rate derived from it). Thus, the problem is to approximate the rate variance, $RV_j(t)$, or more generally the distribution of $B_j(t)$ given $b_j(t)$ (which is the upper bound of the maximum rate) and $\phi_j$ (which is the upper bound of the mean rate). To approximate the rate variance, the entropy of the probability density function is maximized. As a measure of uncertainty or randomness, entropy is defined in Eq. 1 as:

$$h(f) = -\int_S f(x) \ln f(x) dx \quad \text{(Eq. 1)}$$

for a continuous random variable with probability density function f(x). The maximum entropy principle is that among the many possible distributions satisfying the known constraints, the one that maximizes the entropy should be chosen.

The maximum entropy principle is applied to approximate the distribution (and therefore the variance) based on the peak-rate envelope and information about the mean rate. The only information known about the distribution is its range (from 0 to rate envelope $v_j(t)=b_j(t)/t$) and the upper bound of mean rate $\phi_j=\lim b_j(t)/t$ as $t \to \infty$. Based on the maximum entropy principle taught herein, we have the following result: given a flow j's deterministic traffic rate envelope $v_j(t)$ and traffic mean rate upper bound $\phi_j$, the maximum entropy estimate of rate variance $RV_j(t)$ is shown in Eq. 2:

$$\widetilde{RV}_j(t) = \frac{A_j}{\lambda_{j,1}^3}\left[((\lambda_{j,1} v_j(t) - 1)^2 + 1)e^{\lambda_{j,1} v_j(t)} - 2\right] - \phi_j^2 \quad \text{(Eq. 2)}$$

where $\lambda_{j,1}$ is the non-zero solution of:

$$e^{\lambda_{j,1} v_j(t)} + \frac{1 + \phi_j \lambda_{j,1}}{(v_j(t) - \phi_j)\lambda_{j,1} - 1} = 0 \quad \text{(Eq. 3)}$$

and $A_j$ is:

$$A_j = \frac{\lambda_{j,1}}{e^{\lambda_{j,1} v_j(t)} - 1}. \quad \text{(Eq. 4)}$$

Thus, according to the principles of the invention, each traffic envelope is represented as a set of policing parameters. The admission control unit applies Equations 3 and 4 to obtain the parameters of the maximum-entropy distribution for each traffic flow. Then, the admission control unit approximates the rate variance for the traffic flow using Eq. 2. The admission control unit uses the rate variance in the connection admission control decision. If the network element decides to admit the new flow, the flow is set up and the transmission begins. The regulator begins to police the flow so that the flow conforms to its original parameters.

Figure 2:
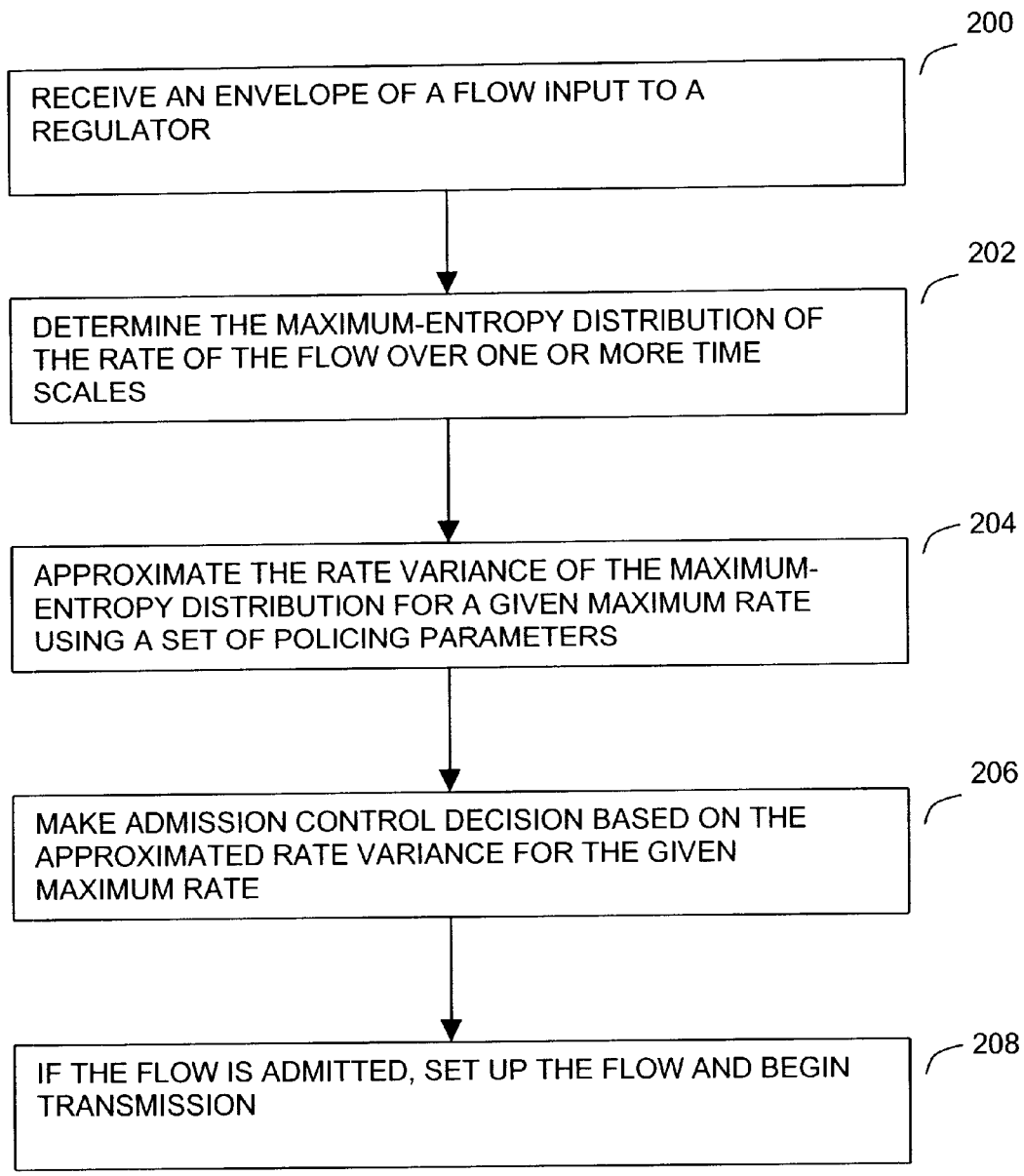
FIG. 2 is a process flow diagram illustrating a call admission process in accordance with the principles of the invention.

FIG. 2 is a process flow diagram depicting the call admission process of the present invention according to a specific embodiment. In the specific embodiment, this process is executed by admission control unit 106, which is attached to the network element 100. An example of the structure of admission control unit 106 is discussed in detail below.

Referring to FIG. 2, in step 200, the admission control unit receives a traffic envelope b(t) of a flow having a varying rate of flow. If a flow has a traffic envelope, b(t), then the maximum rate over any interval length t is v(t)=b(t)/t.

In step 202, the admission control unit maximizes the entropy of a distribution of a rate of low over all time scales. The entropy of the distribution is presented in Eq. 1. It can be shown that the maximum-entropy distribution is an truncated exponential distribution from 0 to v(t). The admission control unit obtains the parameters of the distribution by solving Equations 3 and 4. The admission control unit therefore determines the maximum-entropy distribution for the flow.

In step 204, the admission control unit approximates the rate variance of the maximum-entropy distribution for the flow for a given maximum rate, b(t)/t, using the set of policing parameters, which set contains the mean rate upper bound, the maximum rate upper bound, and the minimum rate bound, in accordance with Eq. 2. In step 206, the admission control unit uses the approximated rate variance to determine whether the loss probability requirement can be met and control admission of the flow to the regulator. If the network element decides to admit the flow, the flow is set up and the transmission begins in step 208. The regulator begins to police the flow so that the flow conforms to its original parameters.

The admission control unit 106 of the present invention may be implemented using hardware, software or a combination thereof and may be implemented in a computer system or other processing system. In an illustrative embodiment, the invention is directed toward one or more computer systems capable of carrying out the functionality described herein. An example computer system 300 is shown in FIG. 3. The computer system 300 includes one or more processors, such as processor 304. The processor 304 is connected to a communication bus 306. Various software embodiments are described in terms of this example computer system. After reading this description, it will become apparent to a person skilled in the relevant art how to implement the invention using other computer systems and/or computer architectures.

Computer system 300 also includes a main memory 308, preferably random access memory (RAM), and can also include a secondary memory 310. The secondary memory 310 can include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well-known manner. Removable storage unit 318 represents a floppy disk, magnetic tape, optical disk, etc. which is read by and written to by removable storage drive 314. As will be appreciated, the removable storage unit 318 includes a computer usable storage medium having stored therein computer software and/or data.

In alternative embodiments, secondary memory 310 may include other similar means for allowing computer programs or other instructions to be loaded into computer system 300. Such means can include, for example, a removable storage unit 322 and an interface 320. Examples of such include a program cartridge and cartridge interface (such as that found in video game devices), a removable memory chip (such as an EPROM, or PROM) and associated socket, and other removable storage units and interfaces which allow software and data to be transferred from the removable storage units to computer system 300.

Computer system 300 can also include a communications interface 324. Communications interface 324 allows software and data to be transferred between computer system 300 and external devices. Examples of communications interface 324 can include a modem, a network interface (such as an Ethernet card), a communications port, a PCM-CIA slot and card, etc. Software and data transferred via communications interface 324 are in the form of signals which can be electronic, electromagnetic, optical or other signals capable of being received by communications interface 324. These signals are provided to communications interface 324 via a communications path 326. This communications path 326 carries signals and can be implemented using wire or cable, fiber optics, a telephone line, a cellular phone link, an RF link and other communications channels.

In this document, the terms "computer program medium" and "computer usable medium" are used to generally refer to media such as removable storage device 318, a hard disk installed in hard disk drive 312, and communications path 326. These computer program products are means for providing software to computer system 300.

Computer programs (also called computer control logic) are stored in main memory 308 and/or secondary memory 310. Computer programs can also be received via communications interface 324. Such computer programs, when executed, enable the computer system 300 to perform the features of the present invention as discussed herein. In particular, the computer programs, when executed, enable the processor 304 to perform the features of the present invention. Accordingly, such computer programs represent controllers of the computer system 300.

In an embodiment where the invention is implemented using software, the software may be stored in a computer program product and loaded into computer system 300 using removable storage drive 314, hard drive 312 or communications interface 324. The control logic (software), when executed by the processor 304, causes the processor 304 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s). In yet another embodiment, the invention is implemented using a combination of both hardware and software.

While there have been illustrated and described what are considered to be example embodiments of the present invention, it will be understood by those skilled in the art and as technology develops that various changes and modifications may be made, and equivalents may be substituted for elements thereof without departing from the true scope of the present invention. For example, the present invention is applicable to all types of data networks, including, but is not limited to, a local area network (LAN), a wide area network (WAN), a campus area network (CAN), a metropolitan area network (MAN), a global area network (GAN), a system area network (SAN), and the Internet. Further, many other modifications may be made to adapt the teachings of the present invention to a particular situation without departing from the scope thereof. Therefore, it is intended that the present invention not be limited to the various example embodiments disclosed, but that the present invention includes all embodiments falling within the scope of the appended claims.

What is claimed is:

1. A method for controlling admission of a flow to a network element, the method comprising:

receiving an envelope of a flow having a varying flow rate;

maximizing the entropy of a distribution of the flow rate over one or more time scales;

determining the maximum-entropy distribution for the flow;

approximating the rate variance of the maximum-entropy distribution for a given maximum rate; and controlling admission of the flow based on the approximated rate variance for the given maximum rate.

2. The method of claim 1, further comprising:

deriving bounds of the minimum rate, the mean rate, and the maximum rate over the one or more time scales based on the envelope.

3. The method of claim 1, further comprising:

if the flow is admitted, setting up the flow and beginning transmission.

4. The method of claim 3, further comprising:

policing the flow.

5. The method of claim 1, wherein:

the network element includes a shared buffer multiplexer connected to a link.

6. The method of claim 5, wherein:

the network element further includes a set of regulators, and a respective flow is received by each of the set of regulators.

7. A computer readable medium having stored thereon instructions which, when executed by a processor, cause the processor to perform steps for controlling admission of a flow to a network element, said steps comprising:

receiving an envelope of a flow having a varying flow rate;

maximizing the entropy of a distribution of the flow rate over one or more time scales;

determining the maximum-entropy distribution for the flow;

approximating the rate variance of the maximum-entropy distribution for a given maximum rate; and controlling admission of the flow based on the approximated rate variance for the given maximum rate.

8. The computer readable medium of claim 7, wherein said steps further comprising:

deriving bounds of the minimum rate, the mean rate, and the maximum rate over the one or more time scales based on the envelope.

9. The computer readable medium of claim 7, wherein said steps further comprising:

if the flow is admitted, setting up the flow and beginning transmission.

10. The computer readable medium of claim 9, wherein said steps further comprising:

policing the flow.

11. The computer readable medium of claim 7, wherein:

the network element includes a shared buffer multiplexer connected to a link.

12. The computer readable medium of claim 11, wherein:

the network element further includes a set of regulators, and a respective flow is received by each of the set of regulators.

13. An apparatus, comprising:

a link;

a shared buffer multiplexer coupled to the link;

a set of regulators coupled to the shared buffer multiplexer;

a respective flow received by each of the set of regulators and having a flow rate;

wherein admission of each flow into the respective regulator is controlled by (a) maximizing the entropy of a distribution of the flow rate over one or more time scales, (b) determining the maximum-entropy distribution for the flow, and (c) approximating the rate variance of the maximum-entropy distribution for a given maximum rate.

14. The apparatus of claim 13, wherein:

admission of each flow is further controlled by deriving bounds of the minimum rate, the mean rate, and the maximum rate over the one or more time scales based on an envelope of the flow.

* * * * *